United States Patent [19]

Freeman et al.

[11] 4,314,287

[45] Feb. 2, 1982

[54] HIGH STORAGE DENSITY DISC FILE

[75] Inventors: Ian B. Freeman, Leslie; John O. Rooney; John F. Hardwick, both of Glenrothes, all of Scotland

[73] Assignee: Burroughs Corporation, Detroit, Mich.

[21] Appl. No.: 138,470

[22] Filed: Apr. 8, 1980

[30] Foreign Application Priority Data

Apr. 11, 1979 [GB] United Kingdom ............... 12826/79

[51] Int. Cl.³ .................................................. G11B 5/09
[52] U.S. Cl. .......................................... 360/51; 360/67
[58] Field of Search ............................... 360/51, 46, 67

[56] References Cited

U.S. PATENT DOCUMENTS

| | | | |
|---|---|---|---|
| 2,901,737 | 8/1959 | Stovall, Jr. .......................... | 360/67 |
| 3,430,215 | 2/1969 | Krossa et al. ........................ | 360/67 |
| 3,524,172 | 8/1970 | Hibner ................................ | 360/51 |
| 3,864,735 | 2/1975 | Davis et al. .......................... | 360/51 |

*Primary Examiner*—Vincent P. Canney
*Attorney, Agent, or Firm*—Howard W. Califano, Jr.; David G. Rasmussen; Kevin R. Peterson

[57] ABSTRACT

A disc file, for the storage of retrievable, informational data in a plurality of concentric, data storage tracks, on a disc rotating at a constant angular velocity, comprises a radially mobile head 44 for data recording or recovery on the disc, a head positioner for positioning the head to interact with selectable tracks on the disc and a variable frequency clock generator for providing data recording or data recovery control signals whose rate of repetition is a linearly increasing continuous function of the radius of interaction of the head with the disc.

10 Claims, 4 Drawing Figures

HIGH STORAGE DENSITY DISC FILE

BACKGROUND OF THE INVENTION

1. Field of the Invention

The present invention relates to a disc file for the storage of retrievable, information data, (in a plurality of concentric data storage tracks) on a rotating disc, wherein the tracks are accessed by a radially mobile head.

2. The Prior Art

The recording capacity of a disc, rotating at fixed angular velocity, for data signals, is limited by the resolvability of recorded signals on that part of the disc which is at least distance from the centre of rotation.

Informational data signals are generally recorded on a disc which rotates at a fixed angular velocity in a plurality of concentric equally spaced circular tracks, each track having, as its centre, the centre of rotation of the disc. A radially mobile transducer, is positioned so as to interact with one track, or a small group of adjacent tracks, to perform a recording or retrieval operation.

Every transducer has associated with it a minimum resolvability. That is, the transducer will give a good response when asked to record or replay signals whose constituent parts are separated by large distances on the recording medium, but as this distance is reduced, the constituent parts of the signal approach, in their separation, the physical dimensions of the acting parts of the transducer. The transducer cannot then distinguish between the constituent parts of the signal and a smeared, degraded response is obtained.

Every recording medium, also, has associated with it, a limit on the closeness with which the constituent parts of the signal may be recorded before a degraded response will be obtained from the transducer. This limit is a function of the material of the recording medium and its style of construction. For example, the recording density on a magnetic disc is limited by the thickness of the magnetic coating on the disc, and by the size of surface defects in the coating.

The maximum number of polarity reversals per unit length, on the medium, is a set characteristic of a disc file. The least length of any data storage track is found at the innermost part of the recorded surface of the disc. The number of polarity reversals on the track of least length sets the number of polarity reversals per revolution of the disc. No matter what the radius of a particular track, the number of polarity reversals is the same as for the innermost track. The parts of the disc, of greatest distance from the centre of rotation, could be used to store more signal than they do if this limitation could be overcome.

A method, well known in the art, is that of clock zoning, where a disc file is provided with several clock generators for the control of data deposition and recovery at different frequencies. Each clock generator is associated with a particular group of radially adjacent tracks on the disc. In use, the clock generators are selected such that the reading and writing of data on the disc is carried on with a frequency which increases with increasing radius of the group of tracks to which an accessed data storage track belongs. This measure, while increasing the amount of data which may be stored on a disc, is generally regarded as cumbersome and costly, being generally reserved for head-per-track machines where performance is of more significance than cost.

SUMMARY OF THE INVENTION

The present invention consists in a disc file, for the storage of retrievable, informational data in a plurality of concentric, data storage tracks on a medium, operable to rotate about the common centre of said tracks at a predetermined angular velocity, comprising; a head for data recording or data recovery on said medium, a head positioner for positioning said transducer to interact with a selectable one out of said plurality of tracks and a variable frequency clock generator, for providing time spaced control signals for data recording or recovery operations, wherein said clock generator is responsive to the radius of said selected track such that the frequency of said control signals increases, in a continuous predetermined manner, with increase in said radius.

In a first preferred embodiment of the present invention, a disc file is provided with a transducer, coupled to the head and providing an output, indicative of the radial position of the head. The output of the transducer is provided as a frequency controlling input to a clock generator comprising a writing clock and a reading clock, whose frequencies are made to track together so as to be linearly proportional to the radius of interaction of the head on the disc.

In a second preferred embodiment, the head positioner is provided with signals indicative of the desired radius of interaction of the head on the disc, which signals are also provided as a frequency controlling input to a clock generator comprising a reading clock and a writing clock, both made to track together so as to have a frequency which is directly proportional to the destination radius of interaction of the head on the disc.

In a third preferred embodiment, the disc file is provided with a transducer coupled to the head and providing an output indicative of the radial position of the head. The output of the transducer is provided as a centre frequency controlling input to a phase locked loop which is allowed to free run when data is being written on the disc, is locked by recovered data signals when data is being read from the disc, and which has a centre or free running frequency which is directly proportional to the radius of interaction of the head on the disc.

In a fourth and last preferred embodiment of the present invention, the head positioner is provided with signals indicative of the desired radius of interaction of the head on the disc, which signals are also provided as a centre frequency controlling signal to a phase locked loop which is allowed to free run when data is being written on the disc, is locked by recovered data signals when data is being read from the disc and which has a free running or centre frequency which is directly proportional to the radius of interaction of the head on the disc.

It is a first novel feature of the present invention that a disc file, for storing retrievable informational data in a plurality of concentric, data storage tracks on a rotating disc, accessed by a radially mobile head, is provided with a variable frequency read/write clock, for controlling the rage of data deposition or decoding, whose frequency is responsive to the radius of interaction of the head on the medium such that its frequency increases with linearly with increase in the radius.

It is a second novel feature that the clock varies its frequency in response to the output of a radial head position transducer.

It is a third novel feature that the clock is a phase locked loop, free running for data deposition and locked to retrieved disc signals for data retrieval.

It is a fourth novel feature that the radial head position signals, provided in a disc file, as a command to a radial head positioner, are also provided as a frequency setting command input to the clock.

DETAILED DESCRIPTION OF THE PREFERRED EMBODIMENTS

Figure 1:
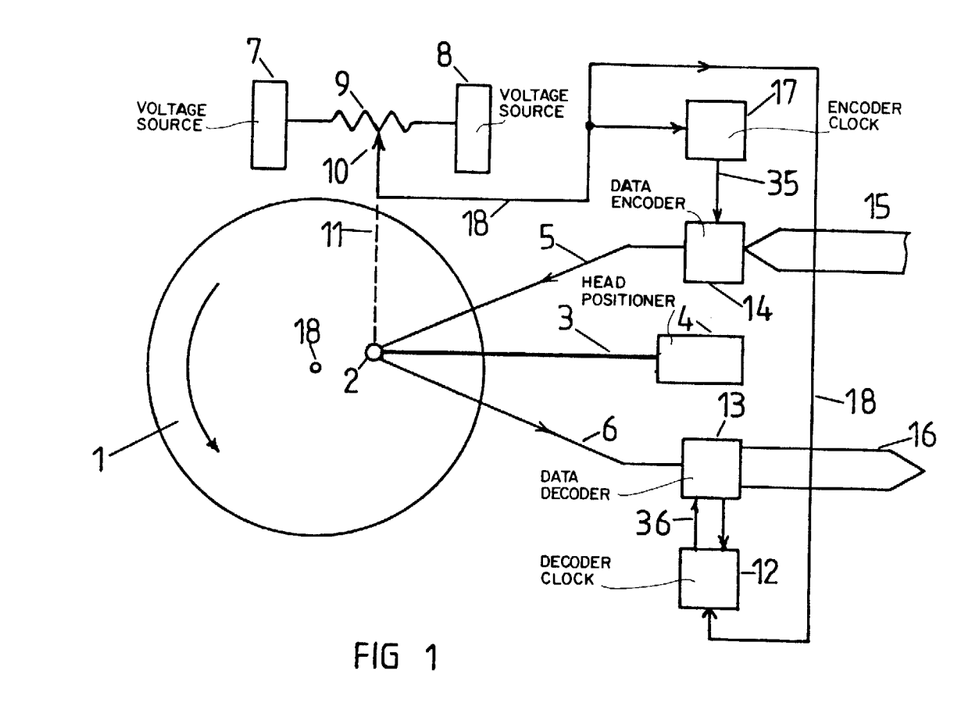
FIG. 1 shows the system of the first preferred embodiment.

A magnetic disc 1, rotating about its centre 18 at a constant angular velocity, has disposed adjacently to its surface, a radially mobile read/write head 2 which is caused to take up different radial positions, on the disc, corresponding to data storage tracks, measured with respect to the disc centre 18, by a head positioner 4 acting on the head 2 via the head position mechanical coupling 3.

The wiper 10 of a linear potentiometer 9 is coupled to the head 2 by means of the wiper mechanical coupling 11. The linear potentiometer 9 is disposed along the path of radial travel of the head 2. The end of the linear potentiometer 9 nearest the centre of the disc 18, is held at a first voltage by a first voltage source 7. The end of the linear potentiometer 9, furthest from the centre of the disc 18, is held at a second voltage by a second voltage source 8. The first and second voltages are such that they linearly reflect the effective radial position on the disc of the ends of the linear potentiometer 9. That is to say, if the wiper of the potentiometer 10 were able to travel to the point where the head 2 was over the centre of the disc 18, at that point, and at that point alone, would the voltage, picked off by the wiper 10, be zero. With radial movement of the head 2, the voltage picked off, by the wiper 10, from the linear potentiometer 9 linearly reflects in direct proportionality, the radial position of the head 2 on the disc 1.

Data, available to the disc file from an external source, is coupled as an input to a data encoder 14 down the write data bus 15. The data encoder 14, under the time regulation of an encoder clock 17, supplied to the encoder via the encoder clock connector 35 converts this data into suitable code for recording on the disc 1, and, during a write operation, causes the coded data to be supplied to the head 2 at a rate proportional to the time repetition rate of the encoder clock 17, via the write connector 5.

Coded data signals, recovered from the disc 1 by the head 2, during a read operation, are coupled as an input to a data decoder 13, via the read connector 6. The data decoder 13 reforms the original data, in a complementary fashion to its original processing by the encoder 14, under the control of a decoder clock 12. The decoded data is given out by the decoder 13 to the external source, via the read data bus 16.

The time rate of repetition of decoder clock 12 is partially responsive to the signals derived by the head 2 from the disc 1, in that, over a small range it will track changes in the mean arrival rate of the signals from the disc 1. The output of the decoder clock is used to split apart aspects of the recorded signal, in the data decoder 13, so that they may be identified, and so reconstituted as data.

The particular decoder clock 12 of this embodiment, is a phase locked loop. For correct locking ratio to the incoming signal, it must be free-running at approximately the correct frequency before locking signals are applied.

The 2 way decoder clock connector 36, supplies locking signals from the data decoder 13 to the decoder clock 12, and clock signals from the decoder clock 12 to the data decoder 13.

Returning to the wiper 10 on the linear potentiometer 9, the output of the wiper 10, is taken via the wiper connector 18, firstly as an input to the encoder clock, and secondly, as an input to the decoder clock.

The encoder clock 14 is such that its frequency is directly proportional to its input voltage from the wiper. The decoder clock 12 is such that the centre frequency of the phase-locked-loop is directly proportional to its input voltage from the wiper 10.

In executing a data retrieval or data deposition operation, the head 2, is sent to the appropriate track (i.e. radius), on the disc 1, and data supplied or recovered as described above. The free running frequency of the decoding clock 12 and the frequency of the encoding clock 14 are automatically set up, by the movement of the head 2, as detected by the linear potentiometer wiper 10 to give the maximum data density on each track of the disc 1.

It will be apparent to those skilled in the art that not all data coding schemes require the presence of a discreet data decoding clock.

It will also be apparent to those skilled in the art that this embodiment would work automatically, even in the absence of the head positioner 4.

It will also be apparent, to those skilled in the art, that any other kind of disc/transducer pair may equally validly be employed.

It will also be apparent to those skilled in the art that the constant of proportionality for increase of frequency with increase of input voltage, must be the same for both clocks.

It will also be apparent to those, skilled in the art, that, with small modifications, the encoding clock 14 and the decoding clock 12 may be made one and the same thus automatically providing an exactly equal constant of proportionality.

Figure 2:
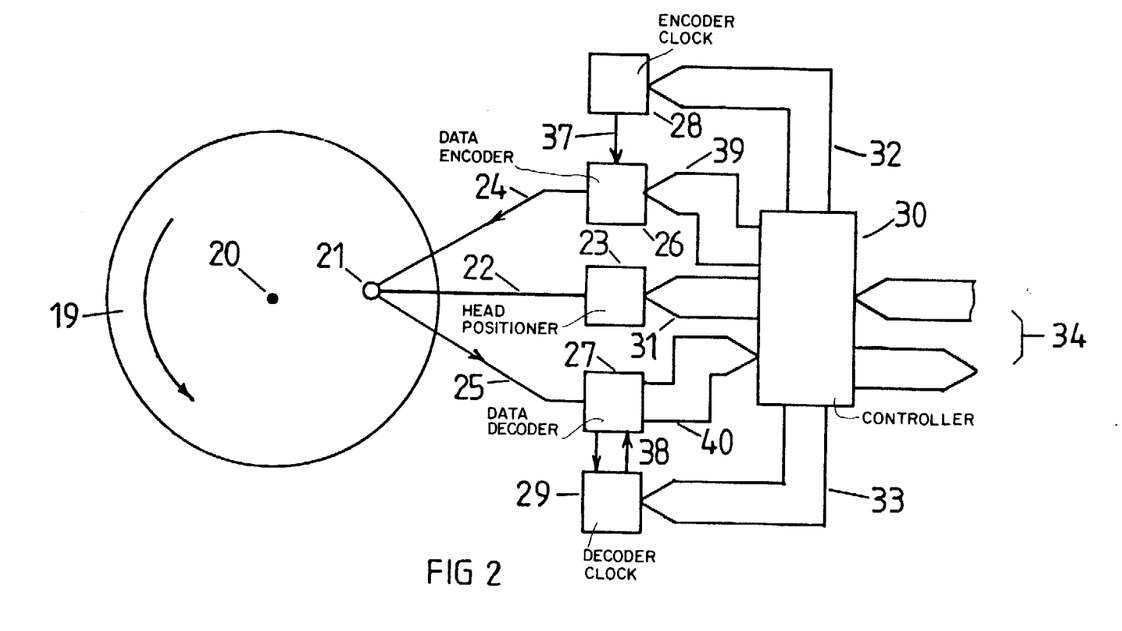
FIG. 2 shows the system of the second preferred embodiment.

Attention is next drawn to FIG. 2.

A magnetic disc 19, rotating about its centre 20 at a constant angular velocity, has disposed adjacently to its surface, a radially mobile magnetic head 21 which is caused to take up different radial positions, on the disc 19 corresponding to data storage tracks, measured with respect to the disc centre 20, by a head positioner 23 acting on the head 21 via the head position mechanical coupling 22.

A controller 30 is provided, responsive to an external host, and supplying signals to the external host, via the bidirectional interface bus 34.

Data, available to the controller 30, from the host, is transferred from the controller 30 as an input to a data encoder 26 via the write data bus 39. The data encoder 26 under the time regulation of an encoder clock 28, supplied to the encoder via the enconder clock connector 37, converts this data into suitable code for recording on the disc 19, and, during a write operation, causes the coded data to be supplied to the head 21 at a rate proportional to the time repetition rate of the encoder clock 28, via the write connector 24.

Coded data signals, recovered from the disc by the head 21, during a read operation, are coupled as an input to a data decoder 27, via the read connector 6. The data decoder 27 reforms the original data, in a complementary fashion to its original processing by the encoder 26, under the control of a decoder clock 29. The decoded data is given out by the decoder 27 to the controller 30 via the read data bus 40, from whence it is given to the host.

The time rate of repetition of the decoder clock 29 is partially responsive to the signals derived by the head 21 from the disc 19, in that, over a small range, it will track changes in the mean arrival rate of the signals from the disc 19. The output of the decoder clock 29 is used to split apart aspects of the recovered signal, in the data decoder 27, so that they may be identified, and so reconstituted as data.

The particular decoder clock 29 of this embodiment, is a phase locked loop. For correct locking ratio to the incoming signal, it must be free running at approximately the correct frequency before locking signals are applied.

The 2-way decoder clock connector 38, supplies locking signals from the data decoder 27 to the decoder clock 29, and clock signals from the decoder clock 29 to the data decoder 27.

The head positioner 23 is responsive to commands, supplied via the positioner command bus 31, from the controller 30, whereby the head positioner 23 causes the head 21 to lie over the data storage track (i.e. radius) indicated by the command from the controller 30.

In executing a data deposition or data retrieval operation, the controller 30, first receives an instruction from the host via the interface bus 34. The controller 30, interpreting the command from the host, next sends out a command to the head positioner 23 causing it to locate the head 21 over the required track.

The controller 30 also sends out commands, firstly, to the encoder clock 28, via the encoder clock bus 32, and secondly, to the decoder clock 29, via the decoder clock bus 33, so that the encoder clock 28 may have the correct writing frequency for maximum data density on the track to which the head 21 has been sent, and so that the free running frequency if the phase locked loop in the decoder clock 29 may be correct for the reception of data from that track, recorded at maximum data density.

In this way, maximum data density on the disc 19 is achieved.

It will be apparent to those skilled in the art that not all data coding schemes require the presence of a discreet data decoding clock.

It will also be apparent to those skilled in the art, that any other kind of disc/transducer pair may equally validly be employed.

It will also be apparent to those skilled in the art, that, with small modifications, the encoding clock 14 and the decoding clock 12 may be made one and the same.

Figure 3:
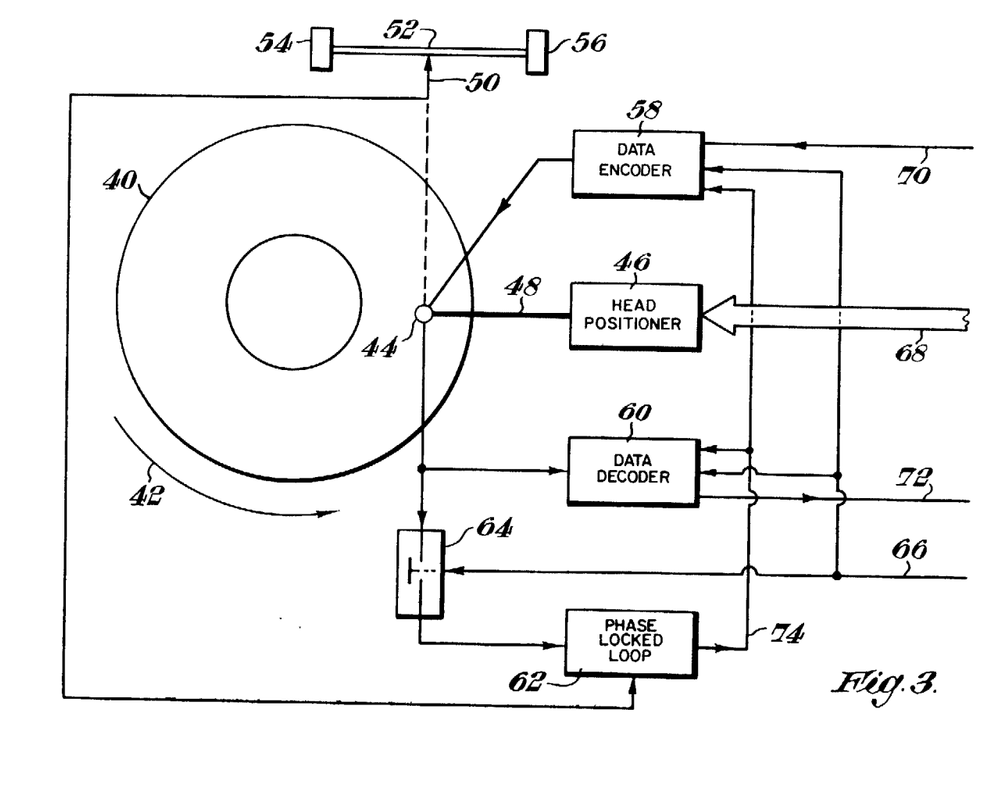
FIG. 3 shows the system of the third preferred embodiment.

Attention is drawn to FIG. 3 showing, in schematic form, the system of the third preferred embodiment of the present invention.

A magnetic disc 40, rotating at fixed angular velocity about its centre as indicated by the arrow 42, is accessed for data deposition or data retrieval by a radially mobile head 44, located by a head positioning servomechanism 46 via a mechanical coupling 48 to interact with any selectable one out of a plurality of concentric, circular data storage tracks on the disc 40.

The head 44 is mechanically coupled to the wiper 50 of a linear strip potentiometer 52, maintained at a first voltage at its first end by a first voltage source 54 and at a second voltage at its second end by a second voltage source 56, the voltages of the two sources 54 and 56 being such that the wiper 50 picks off a voltage which is directly and linearly proportional to the radius of interaction of the head 44 on the disc 40.

There are also present a data decoder 58, selectably operable to encode incoming digital data suitably for recording on the disc 40, a data decoder 60, selectably operable to decode signals, recovered from the disc 40 into digital data in a complementary fashion to the manner of operation of the data encoder 58, a phase-locked-loop clock generator 62 operable to provide timing signals for the operation of both the data encoder 58 and the data decoder 60, and an analogue gate 64, selectably operable either to allow analogue signals to pass therethrough or to block their passage.

Data to be recorded on the disc 40 is coupled to the data encoder 58 via the data input connector 70. Data, recovered from the disc 40 is coupled to the outside world, from the data decoder 60 via the data output connector 72. A track address is provided as the input to the head positioner 46 via the track address bus 68. The head positioner 46 responds to the address by positioning the head 44 to interact with the addressed track. The tracks are evenly radially spaced across the surface of the disc 40 and are numbered such that the track of greatest radius is designated as track zero, and thereafter the tracks are numbered sequentially, by unit increment, until the track of least radius is reached, this track bearing the greatest number.

A read/write command signal is coupled, via the read/write connector 66, as a controlling input to the data encoder 58, the data decoder 60 and the analogue gate 64 such that, when it is logically true, the data encoder is activated, the analogue gate 64 blocks the passage of signals and the data decoder 60 is deactivated, and when it is logically false, the data decoder 60 is activated, the analogue gate 64 allows the through-passage of signals and the data encoder 58 is deactivated.

The output of the data encoder 58 is coupled as an input to the head 44, and is suitable to drive the head 44 to record data on the disc 40. The output of the head 44 is coupled, via the analogue gate 64, as a reference signal input to the phase-locked loop 62. The voltage picked off from the linear potentiometer 52 by the wiper 50 is coupled as a centre frequency controlling input to the phase-locked loop 62. In the absence of a reference signal input, the phase-locked loop 62 free runs at a frequency which is directly proportional to the centre frequency control voltage. The output of the phase-locked loop 62 is coupled, via the clock connector 74, as a time controlling input to both the data encoder 58 and the data decoder 60 and comprises a plural sequence of regularly time spaced signals employed for the correct time regulation of operation of the logic elements therein. The output of the head 44 is also provided as the signal input to the data decoder 60.

When recording data on the disc 40, the signal on the read/write connector 66 is made logically true, and data is supplied to the data encoder 58 via the input data connector 70. The analogue gate 64 prevents the throughpassage of signals, and thus the phase-locked loop 62 is deprived of a reference signal input, and free runs at a frequency directly proportional to its centre frequency control voltage, which in turn is directly proportional to the radius of interaction of the head 44 on the disc 40. The free running frequency of the phase-locked loop 62, and therefore the rate of data deposition onto the disc 40, is thereby rendered directly proportional to the radius of interaction of the head 44 on the disc 40.

When reading data, the signal on the read/write connector 66 is made logically false. The data encoder 58 is thereby deactivated, the analogue gate 64 allows the throughpassage of signals, and the data decoder is activated. The phase locked loop 62, being provided with a reference signal input in the form of signals recovered by the head 44 from the disc 40, responds thereto by adjusting its output frequency and the phase relationship between its clock signals and the reference signal to achieve synchronism despite minor perturbations in the reference signal. The phase-locked loop 62 output so obtained synchronises the operation of the data decoder 60 which provides, as output on the output data connector 72, a reconstitution of the data originally used to record the recovered signals on the disc 40. The phase-locked loop 62, when reading data from the disc, is automatically at the mean of its locking and tracking range by virtue of having been, when free running, the clock source for data recording.

Figure 4:
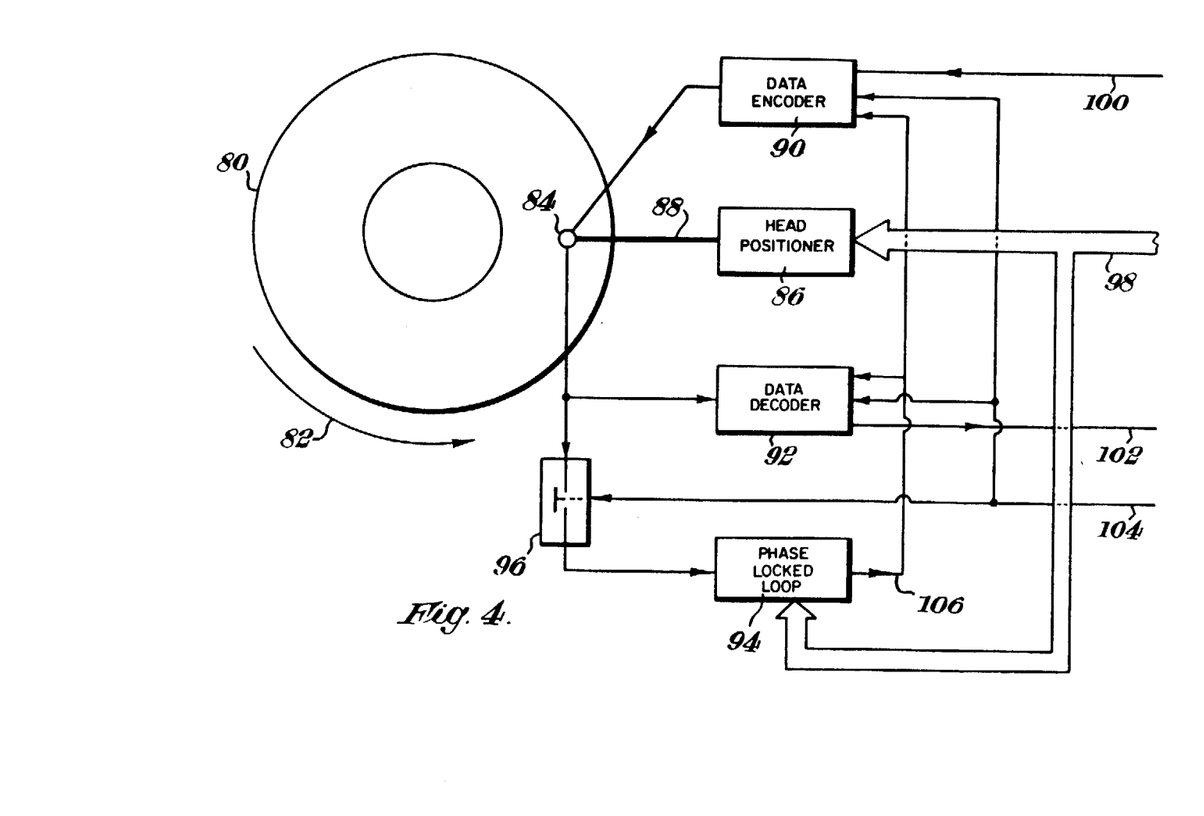
FIG. 4 shows the system of the fourth preferred embodiment.

Attention is lastly drawn to FIG. 4 showing, in schematic form, the system of the fourth preferred embodiment of the present invention.

A magnetic disc 80, rotating at fixed angular velocity about its centre as indicated by the arrow 82, is accessed for data deposition or data retrieval by a radially mobile head 84, located by a head positioning servomechanism 86 via a mechanical coupling 88 to interact with any selectable one out of a plurality of concentric, circular data storage tracks on the disc 80.

There are also present a data encoder 90, selectably operable to encode incoming digital data suitably for recording on the disc 80, a data decoder 92, selectably operable to decode signals, recovered from the disc 80 into digital data in a complementary fashion to the manner of operation of the data encoder 90, a phase locked loop clock generator 94 operable to provide timing signals for the operation of both the data encoder 90 and the data decoder 92, and an analogue gate 96, selectably operable either to allow analogue signals to pass therethrough or to block their passage.

Data to be recorded on the disc 80 is coupled to the data encoder 90 via the data input connector 100. Data, recovered from the disc 80 is coupled to the outside world, from the data decoder 92 via the data output connector 102. A track address is provided as the input to the head positioner 86 via the track address bus 98. The head positioner 86 responds to the address by positioning the head 84 to interact with the addressed track. The tracks are evenly radially spaced across the surface of the disc 80 and are numbered such that the track of greatest radius is designated as track zero, and thereafter the tracks are numbered sequentially, but unit increment, until the track of least radius is reached, this track bearing the greatest number.

The track address signal, from the track address bus 98, is also coupled as a centre frequency controlling input to the phase-locked loop 94. The phase-locked loop 94 includes provision for decoding the track address and responding thereto by adopting a free running frequency, which is directly proportional to the radius of interaction of the head 84 on the disc 80 when the addressed track is accessed.

A read/write command signal is coupled, via the read/write connector 104, as a controlling input to the data encoder 90, the data decoder 92 and the analogue gate 96, such that when it is logically true, the data encoder 90 is activated, the analogue gate 96 blocks the passage of signals and the data decoder 92 is deactivated, and when it is logically false, the data encoder 92 is deactivated, the analogue gate 96 allows the throughpassage of signals and the data decoder 92 is activated.

The output of the data encoder 90 is coupled as an input to the head 84, and is suitable to drive the head 84 to record data on the disc 80. The output of the head 84 is coupled, via the analogue gate 96, as a reference signal input to the phase locked loop 94. In the absence of a reference signal input, the phase locked loop 62 free runs at a frequency which is directly proportional to the radius of the addressed track. The output of the phase locked loop 96 is coupled, via the clock connector 106, as a time controlling input to both the data encoder 90 and the data decoder 92 and comprises a plural sequence of regularly time spaced signals employed for the correct time regulation of operation of the logic elements therein. The output of the head 84 is also provided as the signal input to the data decoder 92.

When recording data on the disc 80, the signal on the read/write connector 104 is made logically true, and data is supplied to the data encoder 90 via the input data connector 100. The analogue gate 96 prevents the throughpassage of signals, and thus the phase locked loop 94 is deprived of a reference signal input, and free runs at a frequency directly proportional to the anticipated radius of interaction of the head 84 of the disc 80. The rate of data deposition onto the disc 80, is thereby rendered directly proportional to the radius of interaction of the head 84 on the disc 80.

When reading data, the signal on the read/write connector 104 is made logically false. The data encoder 90 is thereby deactivated the analogue gate 96 allows the throughpassage of signals, and the data decoder 92 is activated. The phase locked loop 94 being provided with a reference signal input in the form of signals recovered by the head 84 from the disc 80, responds thereto by adjusting its output frequency and the phase relationship between its clock signals and the reference signal to achieve synchronism despite minor perturbations in the reference signal. The phase locked loop 94 output so obtained synchronises the operation of the data decoder 92 which provides, as output on the output data connector 102, a reconstitution of the data originally used to record the recovered signals on the disc 80. The phase locked loop 94, when reading data from the disc is automatically at the mean of its locking and tracking range by virtue of having been, when free running, the clock source for data recording.

It will be apparent to those skilled in the art that other data encoding and decoding schemes exist wherein the use of a phase locked loop clock generator for data decoding is not necessary, but where the present invention, with minor and obvious modifications, may equally well be employed.

What is claimed is:

1. A recording/decoding clock generator for use in a high density disk storage system having a disk rotating at a constant angular velocity and a head positioner, positioning a head to interact with selectable tracks on a disk, comprising:

an analog gate means for allowing the through passage of signals from the head when in the write mode, thereby producing a reference signal;

a head position indicating means for producing a signal indicating the radial displacement of the head; and a phase lock loop clock means, connected to said analogue gate means and said head position indicating means, for producing a clock output to control the rate of data recording on the disk and to synchronize the data decoding, such that when in the write mode said analog gate means is closed, depriving said phase lock loop clock means of said reference signal, and causing said phase locked loop clock means to free-run at a frequency proportional to the radial displacement of the transducer head, and such that, when in the read mode said analog gate means is open allowing a through passage of said reference signal from the head to said phase locked loop clock means and causing said phase locked loop clock means to adjust its clock output frequency and the phase relationship between its clock output signal and said reference signal to achieve synchronism.

2. A recording/decoding clock generator for use in a high density disk storage system having a disk rotating at a constant angular volocity and a head positioner, positioning a head to interact with selectable tracks on the disk, a control signal is sent to the recording/decoding clock generator which indicates radial location of the head, said recording/decoding clock generator comprising:

an analog gate means for allowing the through passage of signals from the head when in the write mode thereby producing a reference signal; and, a phase locked loop clock means, connected to said analog gate means and receiving a control signal indicating head radial position, for producing a clock output to control the rate of data recording on the disk and to synchronize the data decoding such that when in the write mode said analog gate means is closed, depriving said phase lock loop clock means of said phase locking reference, and causing said phase locked loop clock means to run free at a frequency proportional to the radial displacement of the head, and such that, when in the read mode said analog gate is open, allowing a through passage of said reference signal from the head to said phase locked loop clock means and causing said phase locked loop clock means to adjust its clock output frequency and the phase relationship between its clock output signal and said reference signal to achieve synchronism.

3. A recording/decoding circuit for use in a high density disk storage system having a disk rotating at a constant angular velocity and a head positioner, positioning a head to interact with selectable tracks on the disk, comprising:

an analog gate means for allowing a through passage of signals from the head when in the write mode thereby producing a reference signal;

a head position indicating means for producing a signal indicating the radial displacement of the transducer head;

a phase lock loop clock means, connected to said analogue gate means and said head position indicating means, for producing a clock output to control the rate of data recording on the disk and to synchronize the data decoding, such that when in the write mode said analog gate means is closed, depriving said phase lock loop clock means of said reference signal, and causing said phase locked loop clock means to free-run at a frequency proportional to the radial displacement of the transducer head, and such that, when in the read mode said analog gate means is open allowing a through passage of said reference signal from a transducer head to said phase locked loop clock means and causing said phase locked loop clock means to adjust its clock output frequency and the phase relationship between its clock output signals and said phase locked reference signal to achieve synchronism;

a data encoder receiving clock pulses from said phase locked loop clock means and converting input data into suitable code and supplying this coded data to the head at a rate proportional to the time repetition rate of said phase locked loop clock signal; and a data decoder receiving clock pulses from said phase lock loop clock means and decoding and reconstituting data signals read by the head.

4. A recording/decoding circuit for use in a high density disk storage system having a disk rotating at a constant angular velocity and a head positioner, positioning a transducer head to interact with selectable tracks on a disk, a control signal is sent to the recording/decoding circuit indicating radial location of the head, said recording/decoding circuit comprising:

an analog gate means for allowing the through passage of signals from the head when in the write mode thereby producing a reference signal;

a phase lock loop clock means, connected to said analog gate means and receiving a control signal indicating head radial position, for producing a clock output to control the rate of data recording on the disk and to synchronize the data decoding, such that when in the write mode said analog gate means is closed depriving said phase lock loop clock means of said reference signal and causing said phase lock loop clock means to free-run at a frequency proportional to the radial displacement of the transducer head, and such that, when in the read mode said analog gate means is open allowing a through passage of said reference signal from the head to said phase lock loop clock means and causing said phase lock loop clock means to adjust its clock output frequency and the phase relationship between its clock output signal and said reference signal to achieve synchronism;

a data encoder receiving clock pulses from said phase lock loop clock means and converting input data into suitable code and supplying this code data to the head at a rate proportional to the time repetition rate of said phase lock loop clock signal; and, a data decoder receiving clock pulses from said phase lock loop clock means and decoding and reconstituting data signals read by the head.

5. A recording/decoding clock generator for use in a high density disk storage system having a disk rotating at a constant angular velocity and a head positioner, positioning a head to interact with selectable tracks on the disk, comprising:
- a head position indicating means for producing a signal indicating the radial displacement of the transducer head;
- an encoder clock receiving head position indicating signals from said head position indicating means and producing a clock output to control the rate of data recording, said encoder clock signal having a frequency proportional to the radial displacement of the transducer head; and,
- a phase lock loop clock receiving head position indicating signals from said head position indicating means and receiving a reference signal from the head and producing a clock output which has a center frequency proportional to the radial displacement of the head and which is phase and frequency locked to track changes in the arrival rate of data signals read by the head.

6. A recording/decoding clock generator for use in a high density disk storage system having a disk rotating at a constant angular velocity and a head positioner, positioning the transducer head to interact with selectable tracks on the disk, a position control signal being sent to the recording/decoding clock generator indicating radial location of the head, said recording/decoding clock generator comprising:
- an encoder clock receiving head positioning indicating signals from the external controller and producing a clock output to control the rate of data recording, said encoder clock signal having a frequency directly proportional to the radial displacement of the transducer head; and,
- a phase locked loop clock receiving head position indicating signal from the external controller and receiving a reference signal from the head and producing a clock output which has a center frequency proportional to the radial displacement of the transducer head and which is phased and frequency locked to track changes in the arrival rate of data signals read by the head.

7. A recording/decoding circuit for use in a high density disk storage system having a disk rotating at a constant angular velocity and a head positioner, positioning the transducer head to interact with suitable tracks on the disk, comprising:
- a head positioning indicating means for producing a signal indicating the radial displacement of the transducer head;
- an encoder clock receiving head position indicating signals from said head position indicating means and producing a clock output to control the rate of data recording, said encoder clock signal having a frequency directly proportional to the radial displacement of the transducer head;
- a data encoder which receives clock pulses from said encoder clock and converts intput data into a suitable code and supplies this coded data to the head at a rate proportional to the time repetition rate of said encoder clock;
- a phase lock loop clock which receives head position indicating signals from said head position indicating means and receives a reference signal from the head and produces a clock output which has a center frequency proportional to the radial displacement of the transducer head and which is phase and frequency locked to track changes in the arrival rate of data signals read by the head; and,
- a data decoder which receives clock pulses from said phase lock loop clock and decodes and reconstitutes data signals read by the head.

8. A recording/decoding control circuit for use in a high density disk storage system having a disk rotating at a constant angular velocity and a head positioner, positioning the head to interact with selectable tracks on the disk, an externally supplied position control signal is sent to the recording/decoding control circuit indicating radial location of the head, said recording/decoding control circuit comprising:
- an encoder clock receiving head position indicating signals from said external controller and producing a clock output to control the rate of data recording, said encoder clock signal having a frequency directly proportional to the radial displacement of the transducer head;
- a data encoder which receives clock pulses from said encoder clock and converts input data into suitable code and supplies this coded data to the head at a rate proportional to the time repetition rate of said encoder clock;
- a phase lock loop clock which receives position indicating signals from said external controller and receives a reference signal from the head and produces a clock output which has a center frequency proportional to the radial displacement of the transducer head and which is phase and frequency locked to track changes in the arrival rate of data read by the head; and,
- a data decoder which receives clock pulses from said phase lock loop clock and decodes and reconstitutes data signals read by the head.

9. The apparatus of claim 1, 3, 5, or 7 where said head position indicating means is a positional transducer, coupled to said head and operable to provide indication of radial position of interaction of said head on said disk.

10. The apparatus of claim 1, 3, 5, or 7 in which said head position indicating means is a linear potentiometer, disposed along the direction of travel of said head and whose wiper is coupled to said head.

* * * * *